(12) United States Patent
Wood

(10) Patent No.: US 9,796,060 B2
(45) Date of Patent: Oct. 24, 2017

(54) QUICK-CHANGE FLUID SUPPLY APPARATUS FOR MACHINING

(71) Applicant: THE GLEASON WORKS, Rochester, NY (US)

(72) Inventor: Daniel D. Wood, Macedon, NY (US)

(73) Assignee: THE GLEASON WORKS, Rochester, NY (US)

( * ) Notice: Subject to any disclaimer, the term of this patent is extended or adjusted under 35 U.S.C. 154(b) by 290 days.

(21) Appl. No.: 14/416,072

(22) PCT Filed: Aug. 22, 2013

(86) PCT No.: PCT/US2013/056153
§ 371 (c)(1),
(2) Date: Jan. 21, 2015

(87) PCT Pub. No.: WO2014/035789
PCT Pub. Date: Mar. 6, 2014

(65) Prior Publication Data
US 2015/0174720 A1    Jun. 25, 2015

Related U.S. Application Data

(60) Provisional application No. 61/693,872, filed on Aug. 28, 2012.

(51) Int. Cl.
*B23Q 11/10*    (2006.01)

(52) U.S. Cl.
CPC .......... *B23Q 11/10* (2013.01); *B23Q 11/1076* (2013.01); *B23Q 11/1084* (2013.01)

(58) Field of Classification Search
CPC .. B23Q 11/10; B23Q 11/1076; B23Q 11/1084
See application file for complete search history.

(56) References Cited

U.S. PATENT DOCUMENTS

| 4,605,170 A | 8/1986 | Thurner |
| 7,182,674 B2 | 2/2007 | Mundt |
| 8,157,878 B2 * | 4/2012 | Weber et al. ...... B01D 46/0068 55/302 |
| 2004/0217211 A1 | 11/2004 | Erhard et al. |

FOREIGN PATENT DOCUMENTS

| EP | 0393630 A2 | 10/1990 |
| EP | 1468747 A1 | 10/2004 |

OTHER PUBLICATIONS

International Search Report & Written Opinion for PCT/US2013/056153 received from ISA/EP dated Oct. 15, 2013, 9 pgs.

* cited by examiner

*Primary Examiner* — Kevin Lee
(74) *Attorney, Agent, or Firm* — Robert L. McDowell

(57) ABSTRACT

A fluid supply apparatus (2) for a machine tool comprising a header portion (4) and one or more fluid manifolds (6, 8) attachable to the header wherein the fluid manifolds are quickly and easily replaceable on the header without the use of tools.

15 Claims, 12 Drawing Sheets

QUICK-CHANGE FLUID SUPPLY APPARATUS FOR MACHINING

This application claims the benefit of U.S. Provisional Patent Application No. 61/693,872 filed Aug. 28, 2012, the entire disclosure of which is hereby incorporated by reference.

FIELD OF THE INVENTION

The invention relates to apparatus for supplying fluids (e.g. cooling and/or lubricating fluids) to a tool and/or workpiece in a machining process. In particular, the invention is directed to a fluid supply base or header having quickly and easily exchangeable nozzle manifolds.

BACKGROUND OF THE INVENTION

In the machining of materials, particularly hard materials such as metals and some non-metals (e.g. carbides), it is well known to carry out a machining operation in the presence of a fluid (such as a cooling and/or lubricating fluid) that is directed onto the tool and/or workpiece. Examples of such machining operations include cutting and/or grinding of steel workpieces to produce gears and face couplings; grinding of tool steel and/or carbide materials to form or sharpen cutting tools for gears and other tooth articles, and dressing or truing operations to restore a desired form to an abrasive tool such as a grinding wheel.

In many machining operations utilizing the application of cooling and/or lubricating fluids to a tool and/or workpiece, it is known to supply such fluids to the tool and/or workpiece via one or more nozzles or pipes extending from a primary fluid receiving fixture such as a base or header (collectively hereafter "header"). See, for example, U.S. Pat. No. 7,182,674 to Mundt. The particular fluid is usually supplied under pressure to the header wherein it is distributed to the nozzles and/or pipes. The nozzles and/or pipes themselves can be of any number, length and/or configuration so as to convey the fluid for delivery to the desired location on the tool, workpiece or the region of tool-workpiece contact during machining.

It is customary for nozzles and/or pipes to be attached to a header in a manner (e.g. threads or bolts) requiring the use of tools for removing and replacing in situations where differently configured nozzles and/or pipes are required such as machining of a differently configured or sized workpiece. In some instances, the header is manufactured integral with the nozzles and/or pipes such that machining a differently configures or sized workpiece requires another header having appropriately configured nozzles and/or pipes. In either case, considerable time, tools and effort is usually involved to prepare a machine for delivering fluid to a differently configured or sized workpiece.

It is also known to employ reconfigurable fluid nozzles and/or pipes attached to a fluid header whereby machining of a differently configured or sized workpiece can be accommodated by reconfiguring each nozzle and/or pipe to redirect fluid to the appropriate locations with respect to the different workpiece. Here again, time and effort, and possibly tools, are usually involved in such a reconfiguration.

SUMMARY OF THE INVENTION

The present invention is directed to a fluid supply apparatus for a machine tool comprising a header portion and one or more fluid manifolds attachable to the header wherein the fluid manifolds are quickly and easily replaceable on the header without the use of tools.

DETAILED DESCRIPTION OF THE PREFERRED EMBODIMENT

Figure 1:
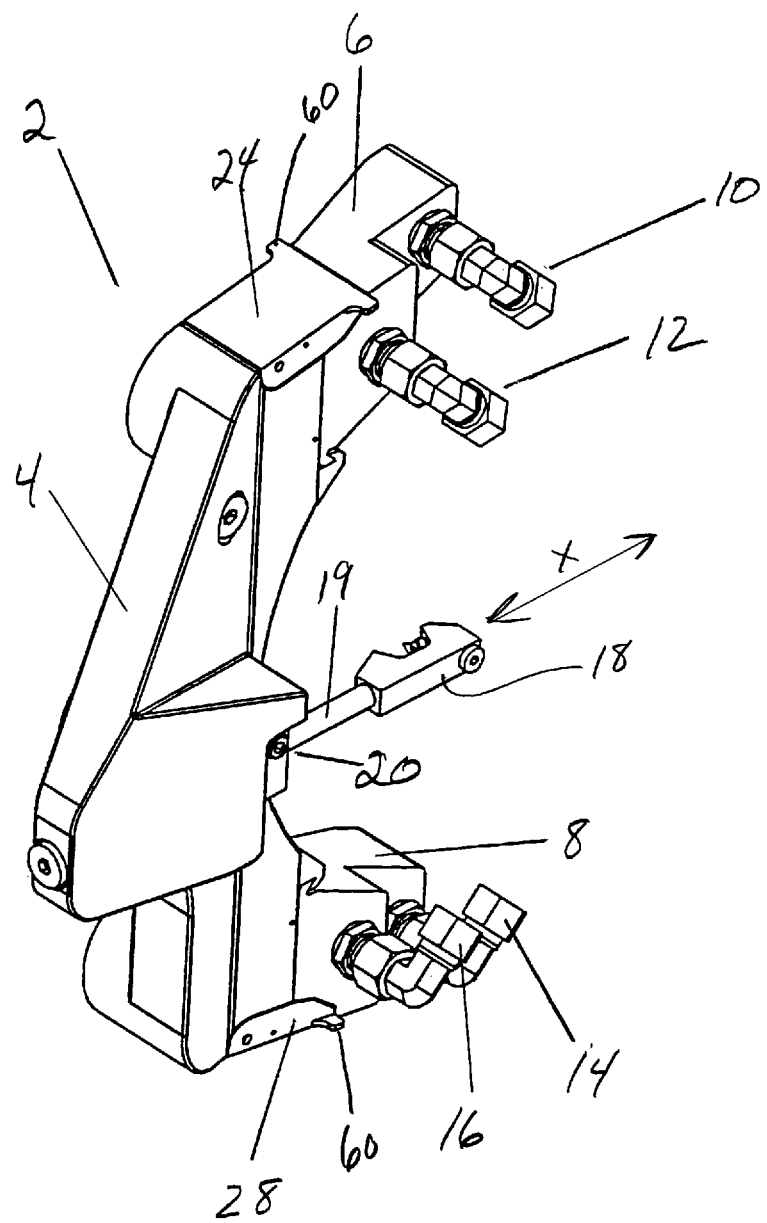
FIG. 1 is a front view of the inventive fluid supply apparatus.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components may be referred to by like reference numbers.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form. In addition, terms such as "first", "second", "third", etc., are used herein for purposes of description and are not intended to indicate or imply importance or significance.

Figure 7:
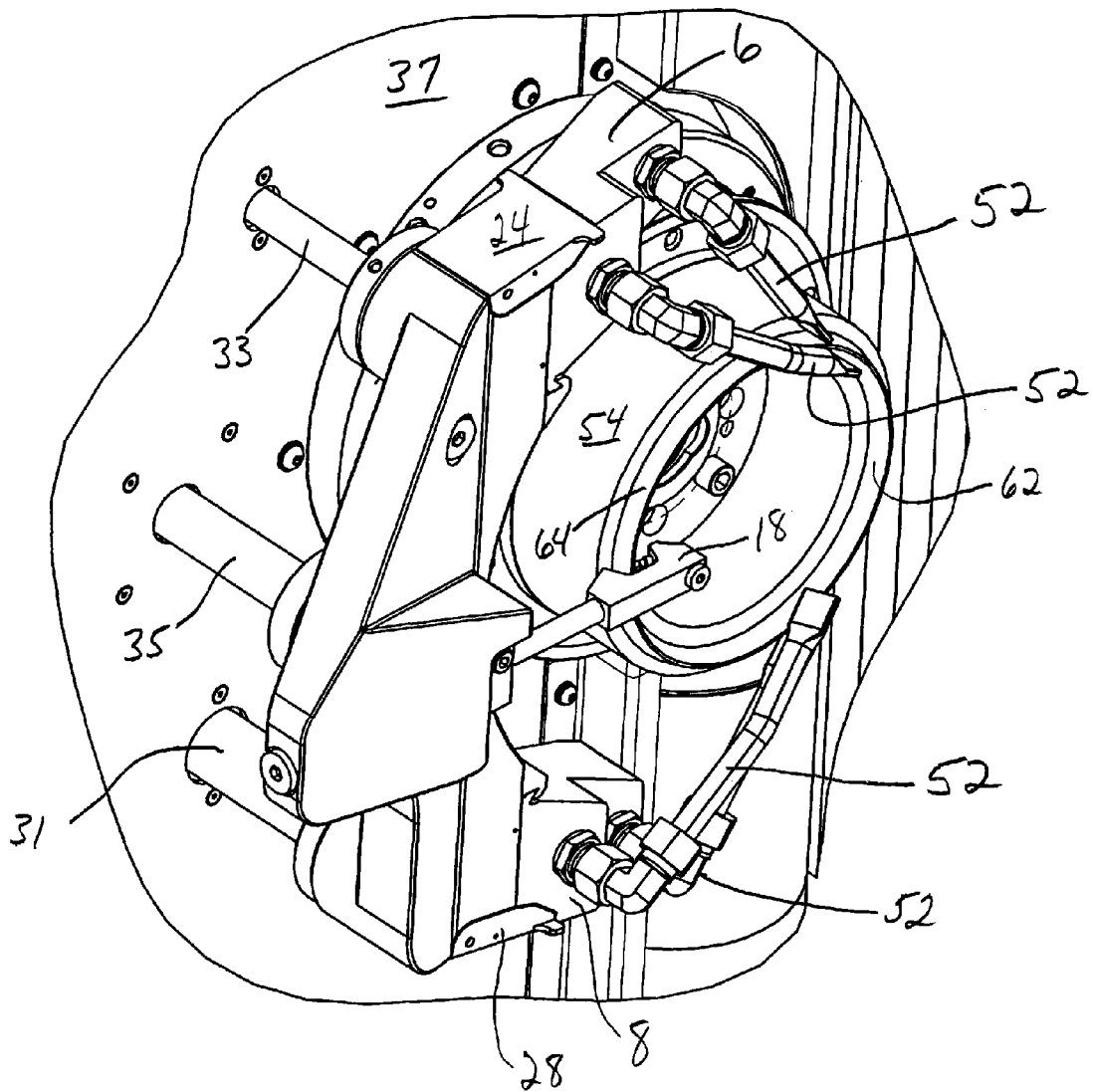
FIG. 7 shows the arrangement of FIG. 6 with the inclusion of fluid nozzles.
Figure 8:
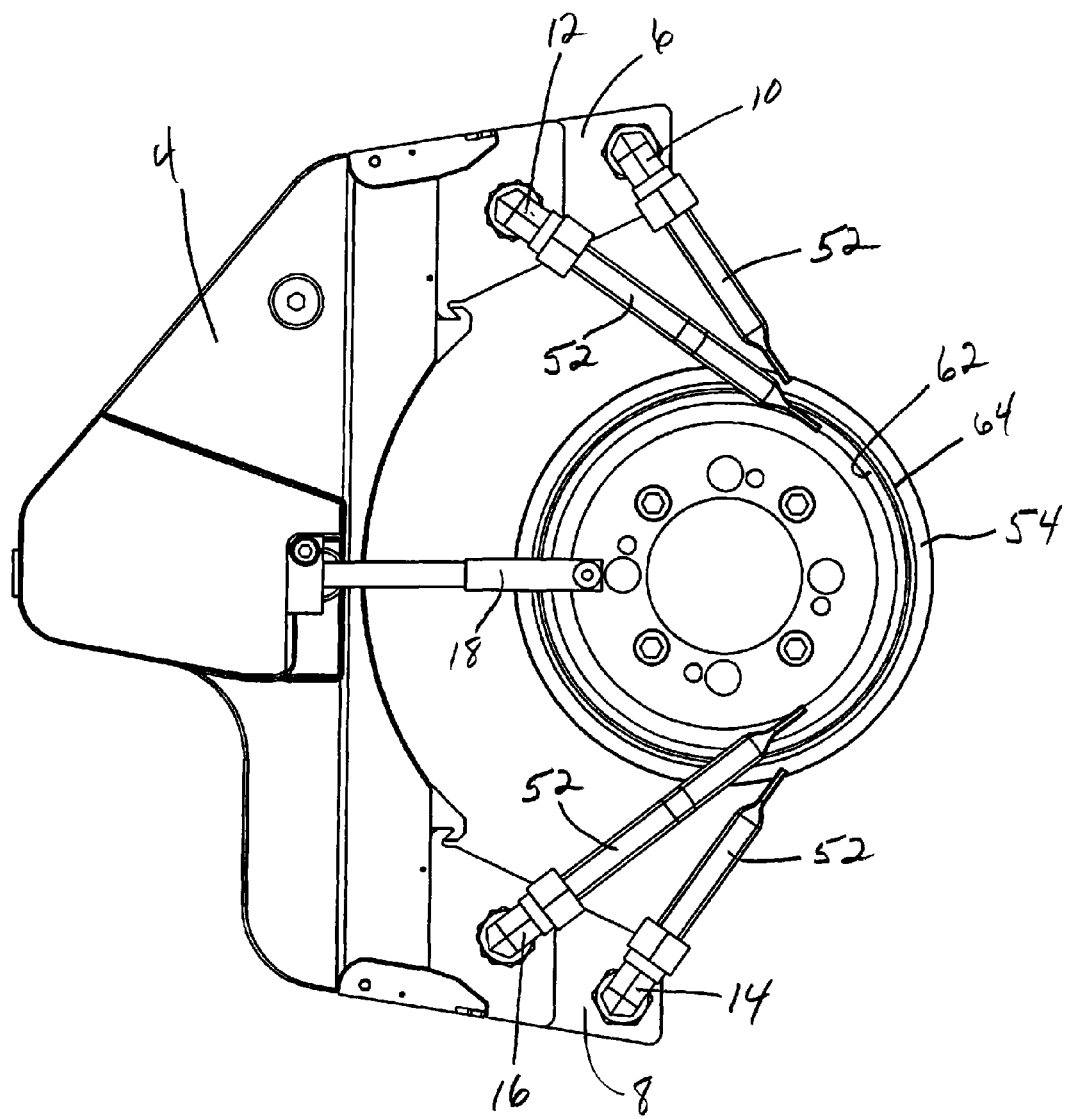
FIG. 8 is a front elevation view of the arrangement of FIG. 7.

FIG. 1 shows an inventive embodiment comprising a front side view of fluid supply apparatus 2 having a header portion 4 and quick-change fluid manifolds 6 and 8. While two fluid manifolds are shown, the present invention contemplates and number of exchangeable fluid manifolds attachable to a header. First fluid manifold 6 includes fittings 10, 12 for attachment of nozzles and/or pipes (e.g. nozzles 52 shown in FIGS. 7 and 8) while second fluid manifold 8 includes fittings 14, 16 for attachment of nozzles and/or pipes. Any number of nozzles and/or pipes may be connected to the fluid manifolds and the number of nozzles and/or pipes connected to one fluid manifold may be different than the number of nozzles and/or pipes connected to another fluid manifold. The configuration and/or orientation of particular nozzles and/or pipes are dependent upon the design of the machine tool and the parameters of the job as can be appreciated by the skilled artisan.

Fluid supply apparatus 2 may include an auxiliary nozzle 18 attached to a pipe 19 that is linearly positionable in a channel 21 (FIG. 3) along direction X and is held in a desired position via a releasable clamping screw 20. For example, nozzle 18 may be utilized to deliver high pressure fluid to a tool, such as a grinding wheel (e.g. 54 in FIGS. 6, 7 and 8), for the purpose of removing debris from the tool (i.e. cleaning the tool). To accommodate different tool diameter sizes, the position of nozzle 18 is preferably adjustable and may be set such as by loosening screw 20, positioning the nozzle 18 along the X direction (radial direction with respect to the grinding wheel 54 of FIG. 6) to a desired location and tightening screw 20 to set the nozzle position. Nozzle 18 may be retractable in channel 21 (to the left in FIG. 3) by an amount sufficient to allow a tool (e.g. grinding wheel) to pass by the header 4 when being installed on or removed from a machine thereby eliminating the need to remove the header during any such installation or removal. Alternatively, nozzle 18 may be pivotable by an amount (e.g. 90 degrees) away from the front of header 4 to create the clearance necessary for tool installation or removal.

Figure 2:
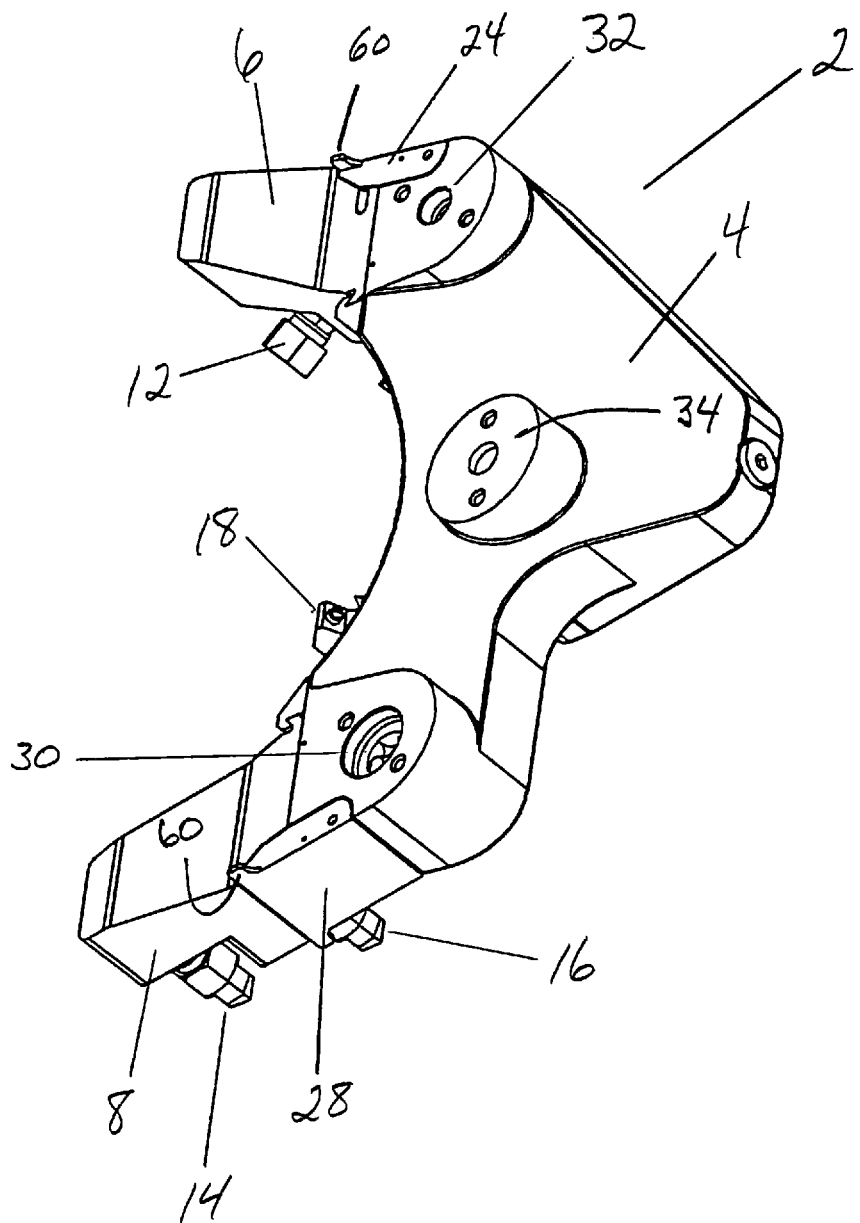
FIG. 2 is a rear view of the inventive fluid supply apparatus.

FIG. 2 shows the opposite side (i.e. back side) of the fluid supply apparatus 2 of FIG. 1. A fluid inlet 30 is connectable to a source of fluid (e.g. high volume fluid flow) via a conveying means such as supply pipe 31 (FIGS. 6 and 7) and is in fluid communication with fittings 10, 12, 14, 16 via internal flow channels formed in header 4 and in fluid manifolds 6, 8. Another fluid inlet 32 may also be included for introducing fluid from a source (e.g. high pressure fluid) via a conveying means such as supply pipe 33 (FIGS. 6 and 7) for conveyance of fluid to nozzle 18 via suitable internal fluid flow channels. The skilled artisan will appreciate that internal flow channels may be formed by any suitable process such as drilling, casting in place or additive manufacturing (e.g. 3-D printing).

Fluid supply apparatus 2 may be releasably secured to a machine tool 37 via mounting surface 34. An example of such a machine tool may be found in U.S. Pat. No. 6,712,566 to Stadtfeld et al. A support, preferably a lengthwise adjustable (manually operated or computer controlled) cylinder 35 (FIGS. 6 and 7) is attached to the fluid supply apparatus 2 via surface 34 so that fluid supply apparatus 2 can be positioned and/or repositioned as necessary (i.e. in the direction of the axis of rotation of grinding wheel 54 in FIG. 6). When an adjustable support such as cylinder 35 is utilized, it is preferable that fluid supply pipes 31, 33 are also lengthwise adjustable. For example, dressing of a grinding wheel (e.g. grinding wheel 54 of FIG. 6) may result in a reduction of the height of the grinding wheel and, therefore, the fluid supply apparatus 2 may be repositioned (via the adjustable cylinder 35) to be properly aligned with the resized grinding wheel. In another example, a newly installed grinding wheel may have a significantly larger height than a worn grinding wheel which it replaced. In that situation, fluid supply apparatus 2 may be repositioned to be properly aligned with the larger dimensions of the new grinding wheel.

Figure 3:
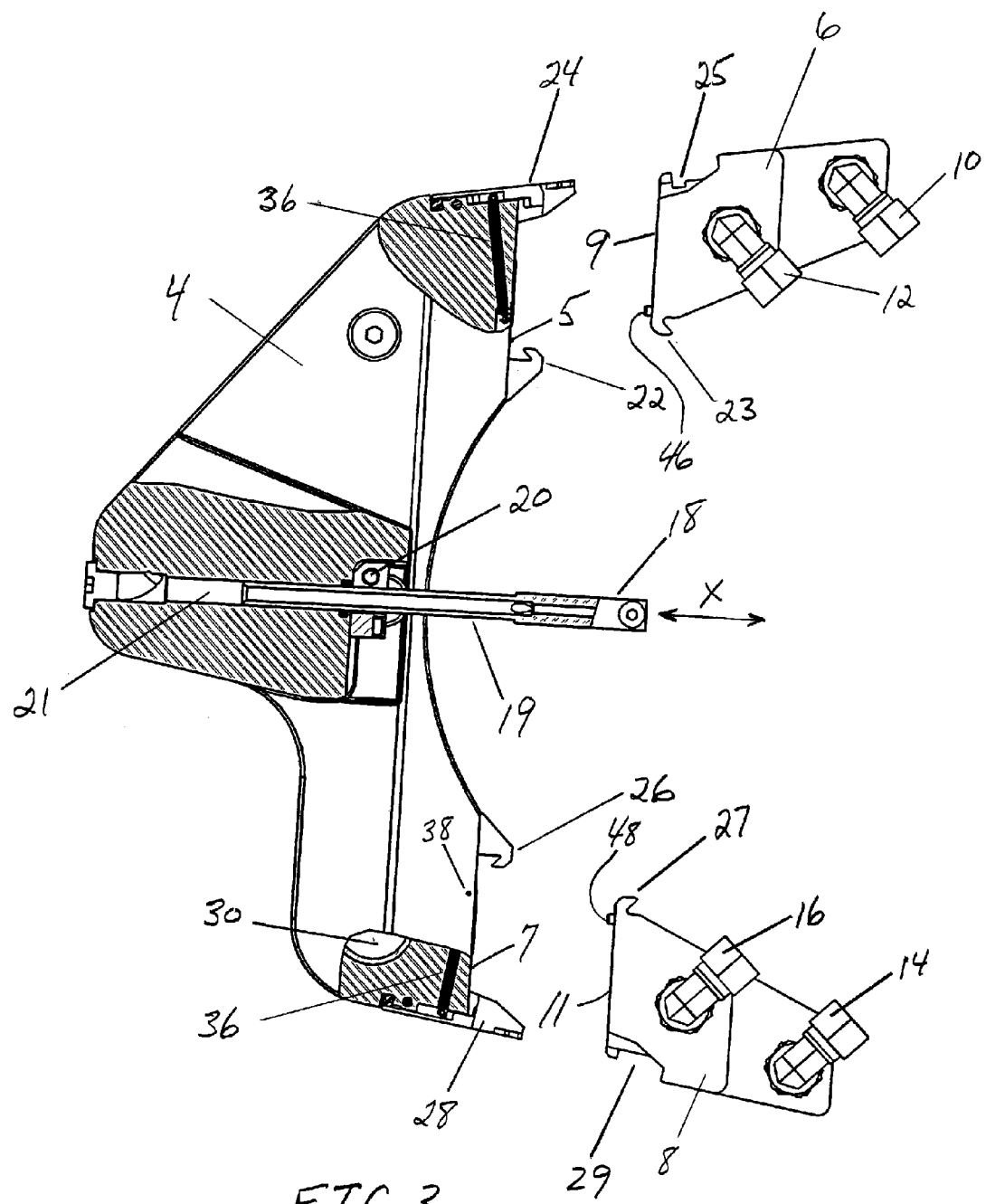
FIG. 3 shows a cross-sectional view of the header separated from the fluid manifolds.
Figure 4:
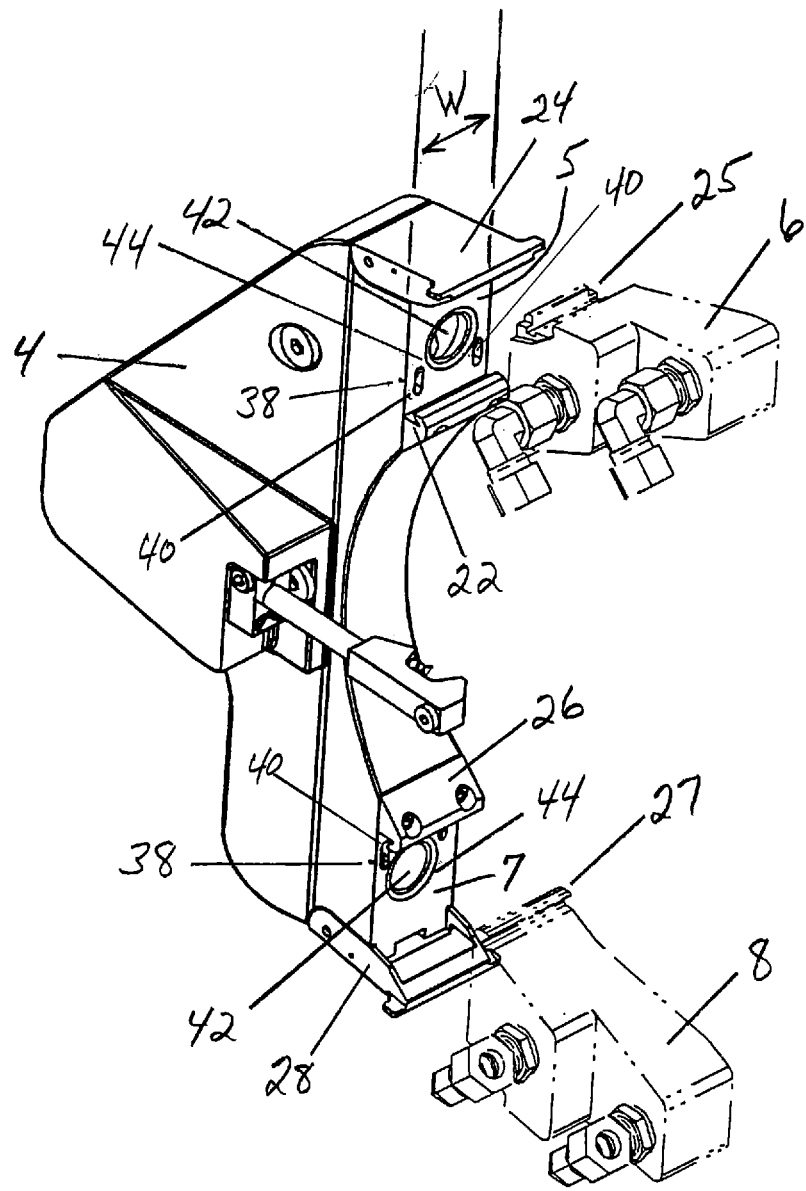
FIG. 4 illustrates the contact end surfaces of the header spaced from the fluid manifolds.

FIGS. 3 and 4 illustrate the quickly and easily removable and exchangeable feature of the fluid manifolds 6, 8. The header 4 includes manifold supports 22, 26 having a preferred generally hook-shape and which preferably extend along at least a portion of the width W (FIG. 4) of the header 4. Header 4 also includes a resilient gripping means such as pivotally movable latches 24, 28 that are each preferably held in a closed position via one or more (preferably two) resilient means such as springs 36. One end of springs 36 is attached to a latch 24, 28 while the other end is attached to header 4 by a dowel 38 positioned in holes 40 (FIG. 4). Generally, one manifold support and one latch are utilized per fluid manifold but the invention is not limited thereto.

Header 4 further includes contact surfaces 5, 7 which mate with respective contact surfaces 9, 11 of fluid manifolds 6, 8 when the fluid supply apparatus 2 is assembled (e.g. FIG. 1). Contact surfaces 5, 7 each include at least one fluid outlet 42 including a seal 44 such as, for example, an O-ring. At least one of the holes 40 in each contact surface 5, 7 serves as a guide to align the fluid manifolds 6, 8 during their attachment to header 4 in that at least one stud 46, 48 appropriately positioned on the contact surface of each fluid manifold 6, 8 is inserted into a hole 40 to align the fluid manifold with the header 4 during attachment to the header.

Figure 10:
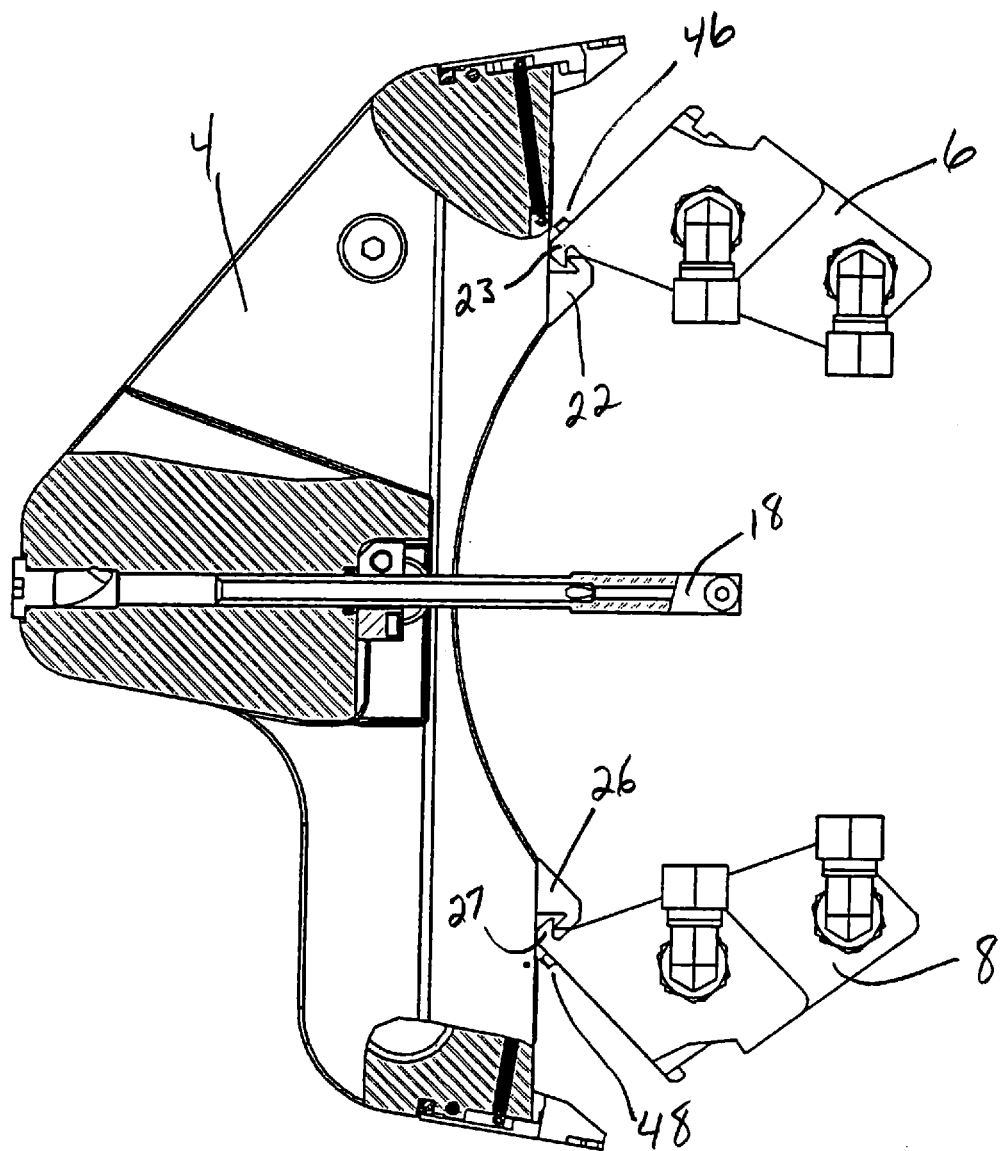
FIG. 10 shows the initial interlocking of the fluid manifolds with the header and aligning the fluid manifolds with the header for attaching the fluid manifolds to the header.
Figure 11:
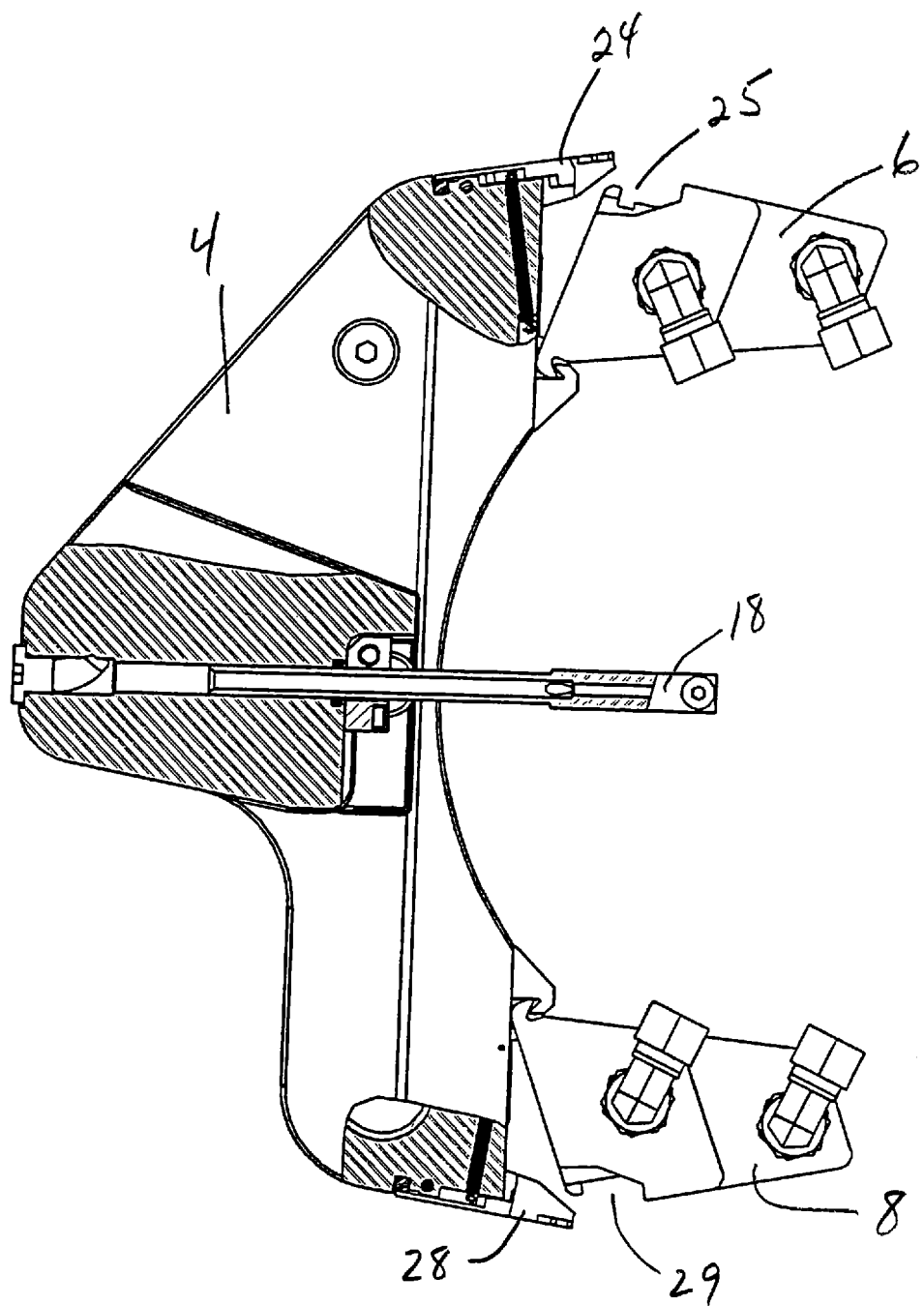
FIG. 11 illustrates a view prior to contact of the fluid manifolds with latches provided on the header.
Figure 12:
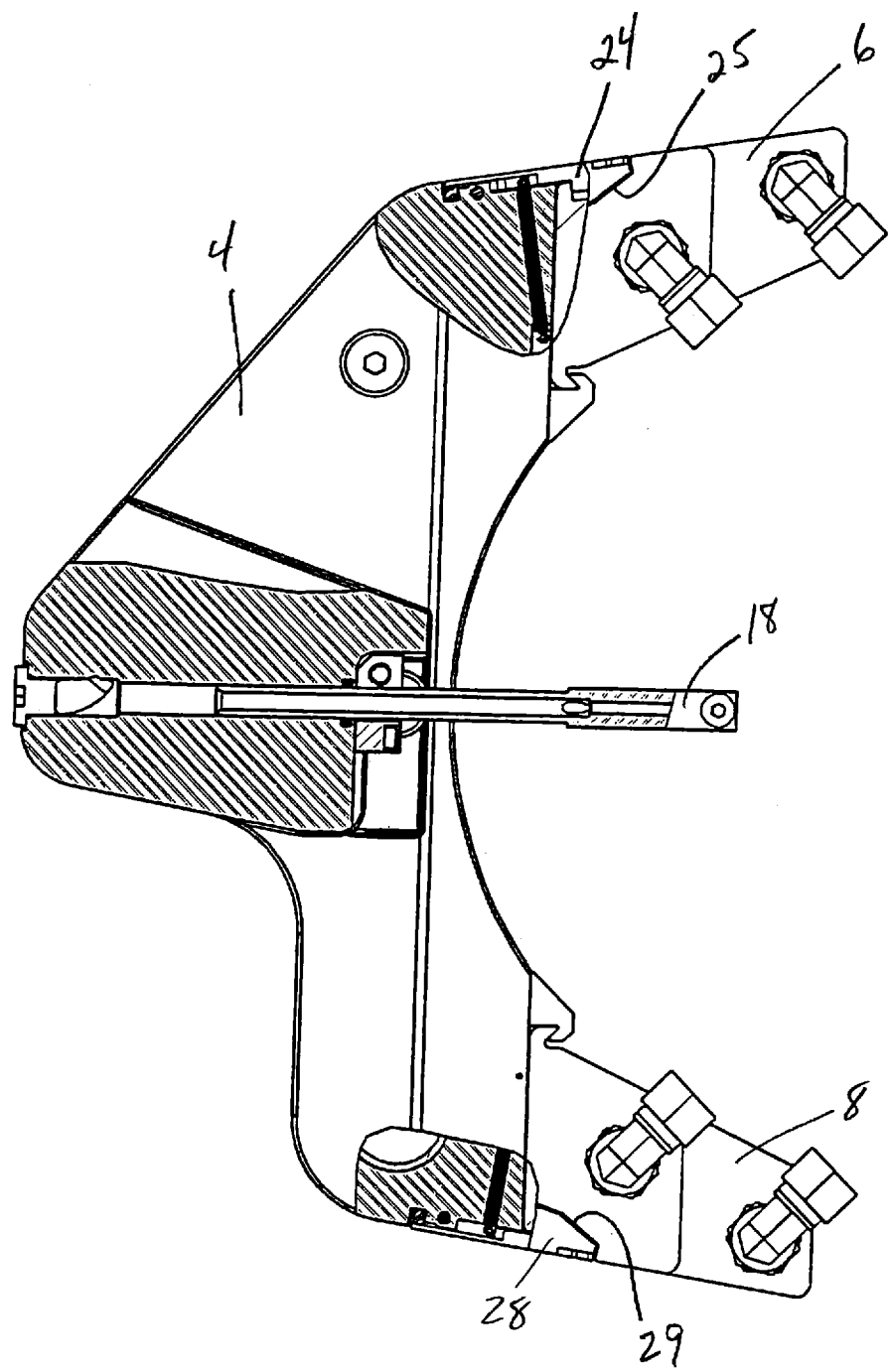
FIG. 12 shows the assembled fluid supply apparatus with latches in locked positions in the fluid manifolds.

Fluid manifolds 6, 8 each include a respective generally hook shaped interlocking surface 23, 27 extending along at least part of the width, W, of the fluid manifolds. Interlocking surfaces 23, 27 have a shape that is complementary to the shape of manifold supports 22, 26 such that hook-shaped surfaces 23, 27 interlock with respective complementary manifold supports 22, 26 upon engagement during the attachment process (FIG. 10). Fluid manifolds 6, 8 also include latch receiving slots 25, 29 each having a shape for receiving and engaging respective latches 24, 28 during the attachment process.

Figure 5:
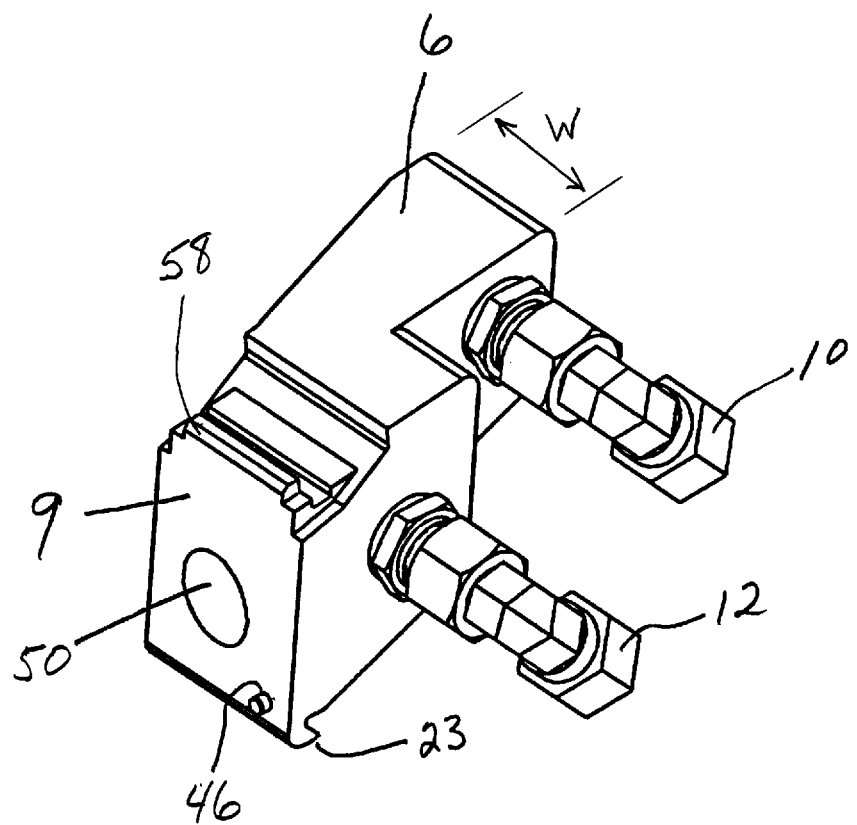
FIG. 5 shows a fluid manifold and its contact end surface.

FIG. 5 shows contact surface 9 of fluid manifold 6 and a fluid inlet 50 for receiving a fluid from outlet 42 when attached to header 4. Channels (not shown) extend within fluid manifold 6 to convey fluid from inlet 50 to fittings 10, 12 and on through suitable nozzles and/or pipes (e.g. nozzles 52 in FIGS. 7 and 8). It is to be understood that a similar inlet and channels are formed in fluid manifold 8 as well as any other fluid manifolds in accordance with the invention.

Figure 9:
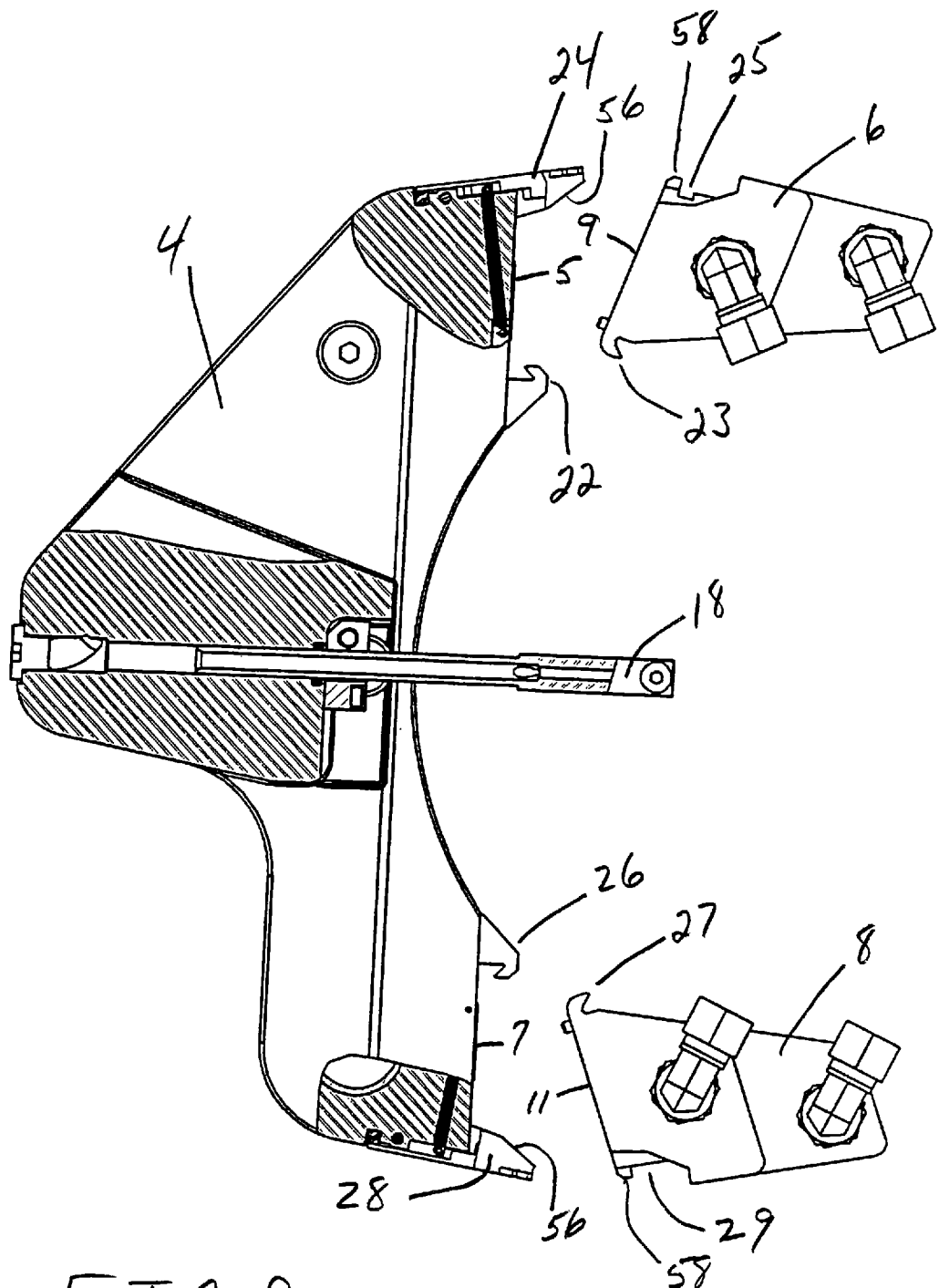
FIG. 9 illustrates the first of a sequence of relative positioning for attaching the fluid manifolds to the header.

FIGS. 9-12 illustrate a sequence of header-manifold positions during attachment of fluid manifolds 6, 8 to header 4. Hook-shaped surfaces 23, 27 are engaged with and interlock with respective complementary manifold supports 22, 26 (FIGS. 9 and 10) and manifolds 6, 8 are then rotated in a generally pivoting manner about manifold supports 22, 26 toward the header 4 to attach the fluid manifold to the header 4. Studs 46, 48 are aligned with and inserted into receiving holes 40 (FIGS. 10 and 11) thereby ensuring proper alignment of the fluid manifolds 6, 8 with header 4. Manifolds 6, 8 are further moved (FIG. 11) toward engagement with latches 24, 28 until latches 24, 28 engage respective latch receiving slots 25, 29 in a snap-fit engagement due to the springs 36 and the angled front surface 56 of latches 24, 28 and the shoulder 58 of the latch receiving slots (FIG. 9). At this point, surfaces 5, 7 of header 4 are in contact with respective surfaces 9, 11 of fluid manifolds 6, 8 and fluid outlets 42 are aligned with fluid inlets 50. The fluid supply assembly 2 is ready for operation.

The fluid manifolds 6, 8 may be removed from the coolant header 4 in a reverse manner wherein latches 24, 28 are raised (preferably sequentially) via their respective tabs 60 (FIGS. 1, 2) and fluid manifolds 6, 8 may then be rotated in a generally pivoting manner about manifold supports 22, 26 away from header 4 to disengage the fluid manifold from the header 4. Rotation continues until hook-shaped surfaces 23, 27 are disengaged from their interlocking relationship with respective complementary manifold supports 22, 26. It should be noted that attachment and removal of fluid manifolds 6, 8 with/from header 4 is accomplished with no tools (i.e. in a tool-less manner) and is easily accomplished by hand.

Figure 6:
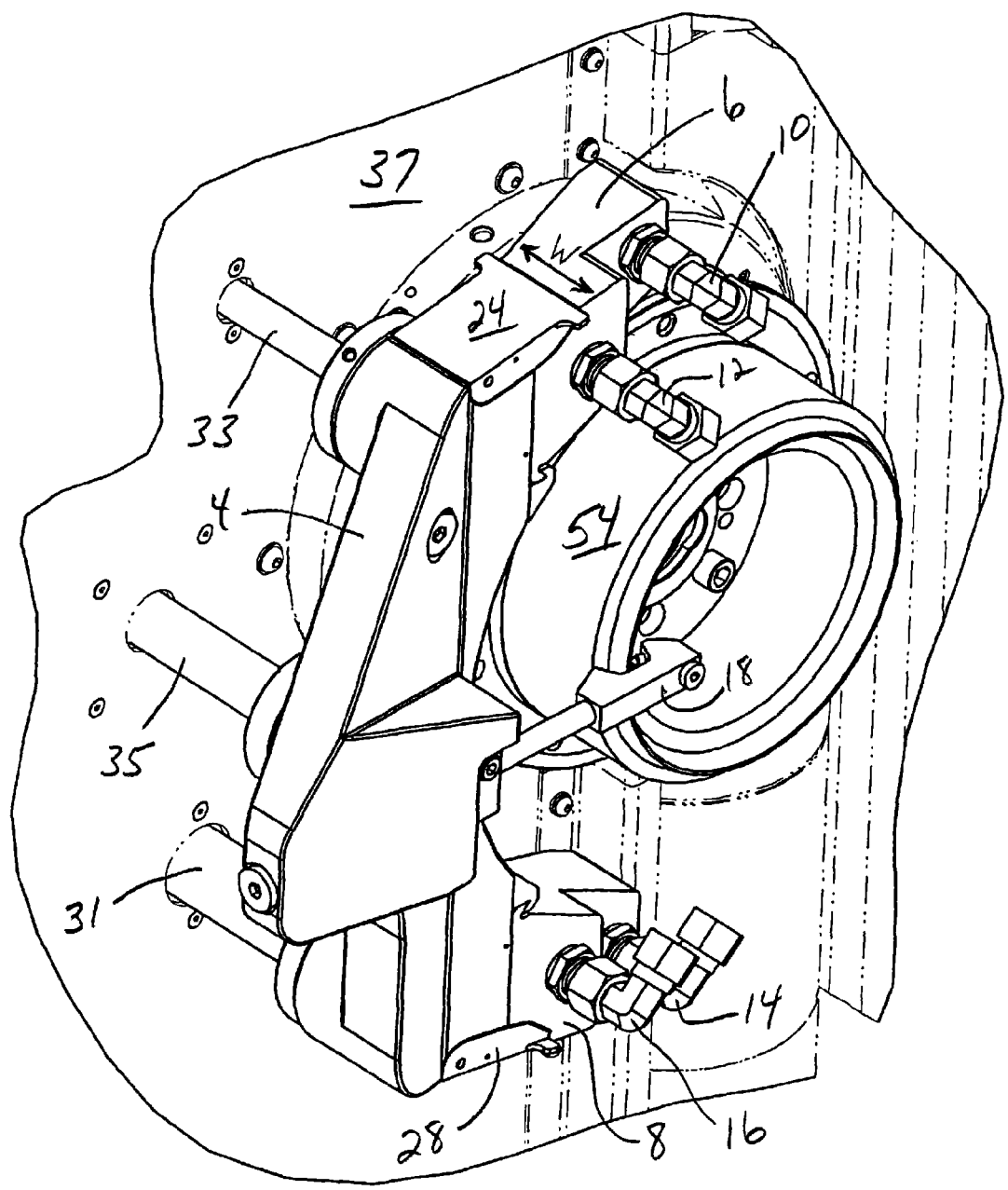
FIG. 6 illustrates an example of the fluid supply apparatus arranged about a grinding wheel on a machine tool.

With respect to the fluid manifolds 6, 8, a preferred embodiment is to arrange the fittings 10, 12 and 14, 16 offset to one another in the width direction, W, as shown in FIGS. 5 and 6. This arrangement enables nozzles 52 (FIGS. 7 and 8) to be more easily and efficiently directed to certain areas of a workpiece and/or tool such as to the inside 62 and outside 64 working surfaces of a grinding wheel 54.

While the inventive fluid supply apparatus 2 has been shown to include nozzles 52 attached to the fluid manifolds, some or all of the nozzles may be replaced by pipes. Any number of nozzles and/or pipes is contemplated for each manifold. One or more than two fluid manifolds are also within the scope of the invention. Additionally, one or more nozzles and/or pipes may be of the adjustable type wherein the precise orientation of each individual nozzle and/or pipe may be set or adjusted (i.e. fine-tuned). Furthermore, while latches 24, 28 are shown to be positioned on the header 4 and studs 46, 48 are shown to be located on the fluid manifolds 6,8, the latches may be located on the fluid manifolds (with receiving slots 25, 29 on the header) and the studs may be located on the header.

With the inventive coolant supply apparatus 2, fluid manifolds may be easily and quickly exchanged manually without the use of tools. This makes it possible to avoid the time consuming task of reconfiguring nozzles and/or pipes, or, replacing individual nozzles and/or pipes with differently configured nozzles and/or pipes for each new configuration and/or size of workpiece. Fluid manifolds with the appropriate number and configuration of nozzles and/or pipes can be prepared beforehand and stored such that upon changing the configuration and/or size of a workpiece, one or more previously configured fluid manifolds can be easily and quickly attached to a header for the new job thereby drastically reducing machine downtime compared to previous repositioning and/or replacing methods.

Although the invention has been discussed with respect to attaching the fluid manifolds to the header via interlocking hook-shaped surfaces and resilient latches, the invention is not limited to this particular embodiment. For example, a pair of opposed latches (upper and lower or front side and back side) may be utilized on either the header or fluid manifold in place of interlocking hook-shaped surfaces. In place of latches, quarter-turn or half-turn screw locking mechanisms may be used. In place of interlocking hook-shaped surfaces, other engaging and pivoting arrangements may be utilized such as a pin and sleeve. Fluid manifolds may be slid into position on a header via a dowel arrangement extending in the width W direction.

Preferably, the header and fluid manifolds are produced from cast metal such as aluminum but other metals or alloys are contemplated such as iron or steel. Alternatively, the header and/or fluid manifolds may be manufactured from nonmetallic materials such as plastics. Fluid manifolds may be color coded such as by painting or anodizing metal or utilizing colored plastics. Color coding may be utilized for identification, inventory control, ease of storage, or to indicate various jobs thereby serving as a check that an appropriate fluid manifold is installed for a particular job.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. Machine tool having a fluid supply apparatus for supplying fluids to a tool and/or workpiece in a machining process of the machine tool, said fluid supply apparatus comprising:
   a header portion;
   at least one exchangeable fluid manifold removably attached to said header portion and in fluid communication therewith, said at least one fluid manifold having at least one fitting for a fluid connection thereto;
   said at least one fluid manifold being attachable to said header portion and removable from said header portion without the use of tools.

2. The machine tool of claim 1 further comprising an auxiliary nozzle in fluid communication with said header portion via a supply pipe, said auxiliary nozzle being linearly positionable.

3. The machine tool of claim 1 wherein said header portion includes at least one fluid inlet.

4. The machine tool of claim 1 wherein said at least one exchangeable fluid manifold is attachable to said header portion via complementary interlocking surfaces located on each of said header portion and said fluid manifold.

5. The machine tool of claim 4 wherein said at least one exchangeable fluid manifold has a width and wherein the complementary interlocking surface on the fluid manifold extends along at least a portion of said width.

6. The machine tool of claim 4 wherein said header portion has a width and wherein the complementary interlocking surface on the header portion extends along at least a portion of said width.

7. The machine tool of claim 4 wherein the interlocking surfaces comprise a first interlocking surface located on said header portion and a second interlocking surface located on said fluid manifold, said first and second interlocking surfaces being complementary and generally hook-shaped.

8. The machine tool of claim 4 wherein the interlocking surfaces comprise a resilient gripping means located on one of said header portion and said fluid manifold and a complementary receiving slot located on the other of said header portion and said fluid manifold.

9. The machine tool of claim 8 wherein said resilient gripping means comprises a pivotally movable latch.

10. The machine tool of claim 1 further comprising guide means to align said fluid manifold on said header portion during attachment.

11. The machine tool of claim 10 wherein said guide means comprises at least one stud positioned on one of said header portion and said fluid manifold and a complementary at least one hole positioned on the other of said header portion and said fluid manifold, said at least one stud being insertable into said at least one hole during attachment for aligning said header portion and said fluid manifold.

12. The machine tool of claim 1 wherein header portion includes a contact surface having a fluid outlet and said at least one exchangeable fluid manifold includes a contact surface having a fluid inlet, whereby upon attachment of the fluid manifold to the header portion, the contact surfaces engage one another and the header portion fluid outlet is aligned with the fluid manifold inlet.

13. The machine tool of claim 12 wherein one of said header portion fluid outlet and said fluid manifold inlet includes a seal.

14. The machine tool of claim 1 further comprising an adjustable support means for attachment of the fluid supply apparatus to a machine tool, whereby once attached to the machine tool, the position of the fluid supply apparatus relative to the machine tool is adjustable.

15. The machine tool of claim 1 further comprising at least one of removably attached nozzles and pipes in fluid communication with the fluid manifold via said at least one fitting.

\* \* \* \* \*